(12) United States Patent
Sugawara

(10) Patent No.: US 11,611,709 B2
(45) Date of Patent: Mar. 21, 2023

(54) FLASH CONTROL APPARATUS, METHOD, IMAGE CAPTURE APPARATUS, FLASH, AND STORAGE MEDIUM

(71) Applicant: CANON KABUSHIKI KAISHA, Tokyo (JP)

(72) Inventor: Azusa Sugawara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 17/028,133

(22) Filed: Sep. 22, 2020

(65) Prior Publication Data

US 2021/0099630 A1    Apr. 1, 2021

(30) Foreign Application Priority Data

Oct. 1, 2019  (JP) .............................. JP2019-181653

(51) Int. Cl.
  *H04N 5/235* (2006.01)
  *H04L 1/08* (2006.01)
  *H04N 5/04* (2006.01)

(52) U.S. Cl.
  CPC ............. *H04N 5/2352* (2013.01); *H04L 1/08* (2013.01); *H04N 5/04* (2013.01)

(58) Field of Classification Search
  CPC ........... H04N 5/2352; H04N 5/04; H04L 1/08
  See application file for complete search history.

(56) References Cited

U.S. PATENT DOCUMENTS

| 8,195,040 B2* | 6/2012 | Shirakawa | H04N 5/2256 396/56 |
| 2008/0298792 A1* | 12/2008 | Clark | G03B 17/00 396/56 |
| 2010/0202767 A1 | 8/2010 | Clark | |
| 2012/0287296 A1* | 11/2012 | Fukui | G03B 31/00 348/E5.042 |

FOREIGN PATENT DOCUMENTS

| CN | 102780839 A | 11/2012 |
| CN | 103491288 A | 1/2014 |
| CN | 105933965 A | 9/2016 |
| JP | 2010185961 A | 8/2010 |
| JP | 2013-105024 A | 5/2013 |

* cited by examiner

*Primary Examiner* — Twyler L Haskins
*Assistant Examiner* — Fayez A Bhuiyan
(74) *Attorney, Agent, or Firm* — Canon U.S.A., Inc. IP Division

(57) ABSTRACT

A control apparatus configured to control a flash such that the flash emits light in synchronization with exposure of an image capture apparatus, includes a wireless communication device configured to perform wireless communication with the flash; and a controller configured to control the wireless communication device, wherein in a period from when the image capture apparatus starts exposure to when the flash emits light, the wireless communication device repeatedly transmits a signal to the flash at a predetermined time interval in order to prevent the flash from transitioning to a power-saving state.

12 Claims, 8 Drawing Sheets

FLASH CONTROL APPARATUS, METHOD, IMAGE CAPTURE APPARATUS, FLASH, AND STORAGE MEDIUM

BACKGROUND OF THE INVENTION

Field of the Invention

The present invention relates to a technique for controlling a flash.

Description of the Related Art

Conventionally, a flash apparatus (wireless flash) controlled through wireless communication with an image capture apparatus has been known. The wireless flash is advantageous in that installation is easier than that of a flash with a wired connection. On the other hand, it is necessary to deal with reliability being lower and delay being greater than with wired communication.

Japanese Patent Laid-Open No. 2010-185961 discloses a technique of ensuring reliability of communication by performing multiple instances of transmitting timing information instructing a light emission timing from the image capture apparatus to the wireless flash. Also, Japanese Patent Laid-Open No. 2010-185961 discloses a technique in which the instructed light emission timing is changed for each piece of timing information such that light is emitted at the same timing even if the wireless flash emits light based on any piece of the timing information among the pieces of timing information transmitted multiple times.

If the shutter speed or the exposure period have been determined before shooting, front curtain synchronous light emission control and rear curtain synchronous light emission control can be achieved using a method disclosed in Japanese Patent Laid-Open No. 2010-185961 by instructing the light emission timing with consideration given to the delay required for communication, the operation timing of the shutter, and the like.

However, if long exposure is performed, and if a slave flash is in a power-saving state, there is a possibility that when the communication state deteriorates, or the like, the slave flash will not exit the power-saving state as intended and synchronous light emission cannot be performed at the timing at which the user wishes to emit light.

Specifically, when there is an error in receiving a response trigger packet, there is a possibility that X synchronization of the shutter timing will not match. Also, similar problem occurs even with bulb shooting in which the light emission period has not been determined before shooting.

SUMMARY OF THE INVENTION

The present invention was made in view of the above-described problems, and improves reliability of light emission control when controlling a flash.

According to a first aspect of the present invention, there is provided a control apparatus configured to control a flash such that the flash emits light in synchronization with exposure of an image capture apparatus, comprising: a wireless communication device configured to perform wireless communication with the flash; and a controller configured to control the wireless communication device, wherein in a period from when the image capture apparatus starts exposure to when the flash emits light, the wireless communication device repeatedly transmits a signal to the flash at a predetermined time interval in order to prevent the flash from transitioning to a power-saving state.

According to a second aspect of the present invention, there is provided a control method for controlling a flash such that the flash emits light in synchronization with exposure of an image capture apparatus, the control method comprising causing a wireless communication device for wirelessly communicating with the flash to repeatedly transmit a signal to the flash at a predetermined time interval in order to prevent the flash from transitioning to a power-saving state in a period from when the image capture apparatus starts exposure to when the flash emits light.

Further features of the present invention will become apparent from the following description of exemplary embodiments with reference to the attached drawings.

DESCRIPTION OF THE EMBODIMENTS

Figure 1:
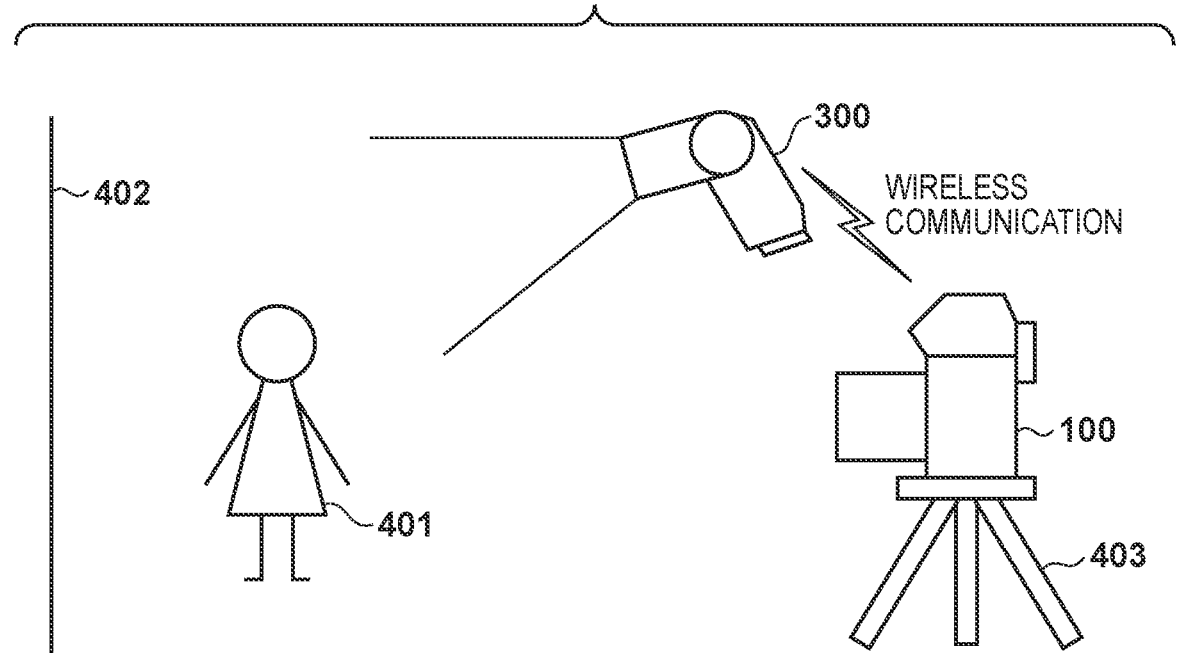
FIG. 1 is a schematic view of a flash control camera system according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic view showing a flash control camera system according to a first embodiment of the present invention. The flash control camera system of the present embodiment is a wireless flash system constituted by a digital single-lens reflex camera (image capture apparatus) and a flash (flash apparatus).

The digital single-lens reflex camera (hereinafter referred to as "camera") 100 includes a wireless communication circuit and a wireless antenna. On the other hand, a flash 300 that is independent from the camera 100 includes a wireless communication circuit and a wireless antenna, similarly to the camera 100. The camera 100 and the flash 300 perform wireless communication with each other using a method such as IEEE 802.15.4, which is a known wireless communication standard.

FIG. 1 envisions flash shooting at a photography studio, and shows a state in which the camera 100 is fixed by a tripod 403 with respect to a subject 401 and a screen 402. In the present embodiment, the camera 100 is a master device, the flash 300 is a slave device, and flash synchronous shooting in which the light emission timing of the flash 300 is synchronized with the shutter timing of the camera 100 is performed.

In the present embodiment, a system is described in which the camera 100 sends an instruction as the master to the flash 300 through wireless communication. However, it is also possible to use a wireless flash system in which a flash that is attached directly to the camera 100 is set as the master and sends an instruction to the flash 300 through wireless communication.

Figure 2A:
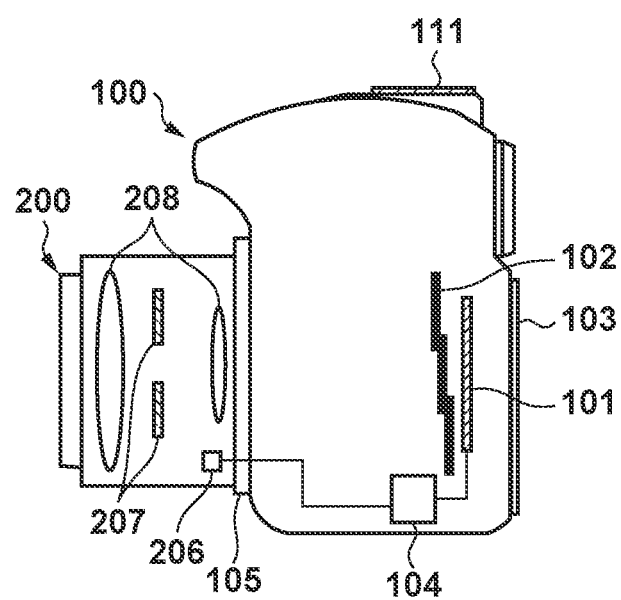
FIGS. 2A and 2B are a schematic vertical cross-sectional view and a rear view of a camera.
Figure 2B:
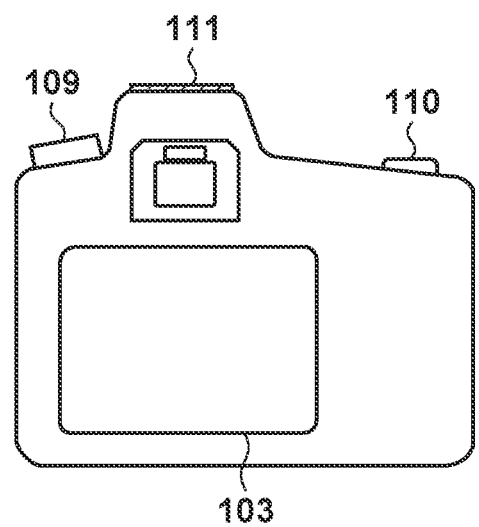

FIGS. 2A and 2B are a schematic vertical cross-sectional view (vertical cross-sectional view including an optical axis) and a rear view of the camera 100 according to the present embodiment. Note that in FIGS. 2A and 2B, configurations that are needed to describe the embodiments among the configurations included in the camera 100 are shown.

The camera 100 and a shooting lens 200 are connected via amount 105, and the shooting lens 200 is an exchangeable lens that can be removed from the camera 100. The shooting lens 200 includes a lens group 208 and forms an optical image of the subject on the imaging plane of an image sensor 101.

The image sensor 101 is, for example, a CMOS image sensor, and includes multiple photoelectric conversion elements that are aligned in two dimensions. The image sensor 101 converts the optical image formed by the shooting lens 200 into electrical signals (image signals) using the multiple photoelectric conversion elements. The sizes of the electrical signals (voltage values) with respect to the same light reception amount can be changed by changing the sensitivity of the image sensor 101.

The shutter 102 includes a front curtain and a rear curtain that are arranged in front of the image sensor 101 and travel vertically. The front curtain is referred to as a first curtain, and the rear curtain is referred to as a second curtain. When the state in which the optical path is blocked is denoted as fully closed and the state in which the optical path is open is denoted as fully open, if the front curtain is to be made fully open in a state in which the rear curtain is fully open and the front curtain is fully closed, the exposure of the image sensor 101 is started. Thereafter, after the elapse of a predetermined amount of time, when the rear curtain is fully closed, exposure of the image sensor 101 ends. If the exposure time is shortened, travel of the rear curtain is started before the front curtain is fully open, and the image sensor 101 is exposed to light through a slit-shaped opening that is formed between the front curtain and the rear curtain.

A camera microcomputer 104 includes, for example, a programmable processor and a memory, and the operations of the camera 100 and the shooting lens 200 are controlled by loading a program stored in a non-volatile memory to the system memory and executing it.

A lens control unit 206 of the shooting lens 200 includes, for example, a programmable processor and a memory, and the operation of the shooting lens 200 is controlled by loading a program stored in a non-volatile memory to the system memory and executing it. The operation of the shooting lens 200 includes driving of a diaphragm 207, driving of a moveable lens included in the lens group 208, and the like. A focus lens, a magnification lens, and the like are included in the moveable lens. The lens control unit 206 can communicate with the camera microcomputer 104 through the mount 105, controls the operations of the shooting lens 200 according to an instruction or a request from the camera microcomputer 104, and transmits the information of the shooting lens 200 to the camera microcomputer 104.

The camera microcomputer 104 can execute automatic exposure control (hereinafter referred to as "AE") for determining exposure control values (diaphragm value, shutter speed, shooting sensitivity) based on luminance information of an image shot using the image sensor 101, for example. Also, the camera microcomputer 104 can execute automatic focus adjustment (hereinafter, AF) for controlling the focus distance of the shooting lens 200 so as to focus on a predetermined region in an image capture range based on contrast information of an image shot using the image sensor 101.

Note that the configuration by which the camera microcomputer 104 realizes AE and AF is not limited to these, and any known configuration, such as a configuration using an AE sensor or an AF sensor, can be used.

A display unit 103 is composed of a liquid crystal display, an organic EL display, or the like, and displays an image shot using the image sensor 101, displays information of the camera 100 (various setting values, a battery remaining amount, number of recordable images, etc.), and displays a GUI. The display unit 103 may also be a touch display.

A mode selection unit 109 is an operation member for selecting a shooting mode of the camera 100. Shooting modes are modes with different methods for setting exposure control values, and examples thereof include an aperture priority mode, a shutter speed priority mode, a program mode, and an auto mode. A shooting mode for setting an exposure control value that is suitable for a specific subject or situation, such as shooting of a moving object or shooting of a person, is included in some cases.

A shooting instruction unit (hereinafter referred to as a "shutter button") 110 includes a switch SW1 that is switched on in a half-pressed state, and a switch SW2 that is switched on in a fully-pressed state. The camera microcomputer 104 recognizes the half-pressed state (switching on of the switch SW1) as a shooting preparation instruction, and recognizes the fully-pressed state (switching on of the switch SW2) as a shooting start instruction. When the shooting preparation instruction is recognized, the camera microcomputer 104 executes AE and AF. Also, when the shooting start instruction is recognized, the camera microcomputer 104 starts still image processing including the driving of the shutter 102 and flash illumination control.

Operation members included in the camera 100, such as the mode selection unit 109 and the shutter button 110, are electrically connected to the camera microcomputer 104. The camera microcomputer 104 monitors the states of the operation members, and upon detecting a change in the state of an operation member, executes an operation corresponding to the detection.

If a long exposure mode (bulb mode) has been selected by the mode selection unit 109, upon recognizing a shooting start instruction, the camera microcomputer 104 drives the shutter 102, sets the front curtain and the rear curtain to fully open, and exposes the image sensor 101. While the shooting start instruction continues to be recognized, the camera microcomputer 104 continues the exposure of the image sensor 101. When the shooting start instruction is no longer recognized, the camera microcomputer 104 sets the front curtain and the rear curtain of the shutter 102 to fully closed and ends the exposure of the image sensor 101. In another shooting mode, the camera microcomputer 104 controls the exposure time of the image sensor 101 according to a shutter speed that was set through automatic exposure control or set by the user.

A flash mounting unit 111 is a so-called hot shoe, and an external flash can be mechanically and electrically connected thereto. The flash mounted on the flash mounting unit 111 and the camera microcomputer 104 can communicate with each other and the setting and the operation of the flash can be controlled from the camera microcomputer 104.

Figure 3:
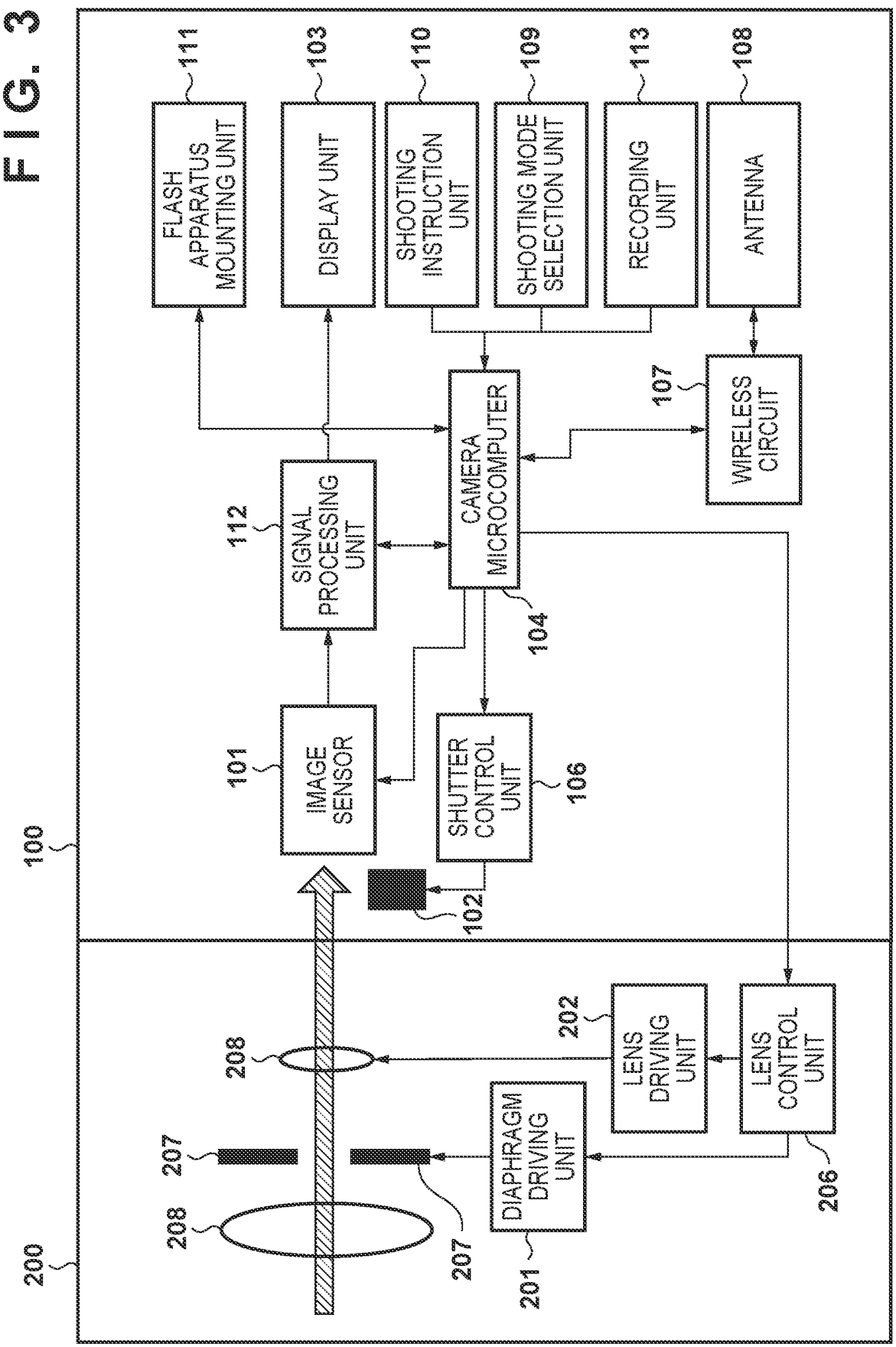
FIG. 3 is a block diagram showing an example of a functional configuration of the camera shown in FIGS. 2A and 2B.

FIG. 3 is a block diagram showing an example of a functional configuration of the camera 100 shown in FIGS. 2A and 2B. The configurations shown in FIGS. 2A and 2B are denoted by the same reference numerals thereas, and redundant description thereof is omitted.

A diaphragm driving unit 201 is a motor or an actuator that drives a diaphragm 207 of the shooting lens 200, drives the diaphragm 207 according to control performed by the lens control unit 206, and adjusts the size of the opening of the diaphragm 207.

The lens driving unit 202 is a motor or an actuator that drives the moveable lenses included in the lens group 208 of the shooting lens 200, drives the moveable lenses according to the control of the lens control unit 206, and adjusts the focus distance and the focal length (angle of view) of the shooting lens 200.

A shutter control unit 106 includes a motor, a spring, and the like for driving the front curtain and the rear curtain of the shutter 102, executes a shutter charge according to control performed by the camera microcomputer 104, and causes the shutter curtains to travel.

A signal processing unit 112 applies various processes to the image signals output by the image sensor 101, such as noise removal, white balance adjustment, color interpolation, various types of correction, resolution conversion, and generation of evaluation values to be used in AF and AE. The signal processing unit 112 generates image signals for display and outputs them to the display unit 103, generates image data files for recording, and outputs them to the camera microcomputer 104. The signal processing unit 112 also detects a predetermined region of a subject, such as a face of a person, and detects movement of the subject. The signal processing unit 112 also performs encoding and decoding of image data as needed.

A recording unit 113 is, for example, a memory card, and the camera microcomputer 104 records image data files for recording that are acquired from the signal processing unit 112 in the recording unit 113. The recording format and the image data file format are determined in advance.

A wireless circuit 107 performs wireless communication with the later-described flash 300 via an antenna 108. The camera microcomputer 104 controls the light emission timing of the flash 300 through wireless communication via the wireless circuit 107 and the antenna 108.

Figure 4:
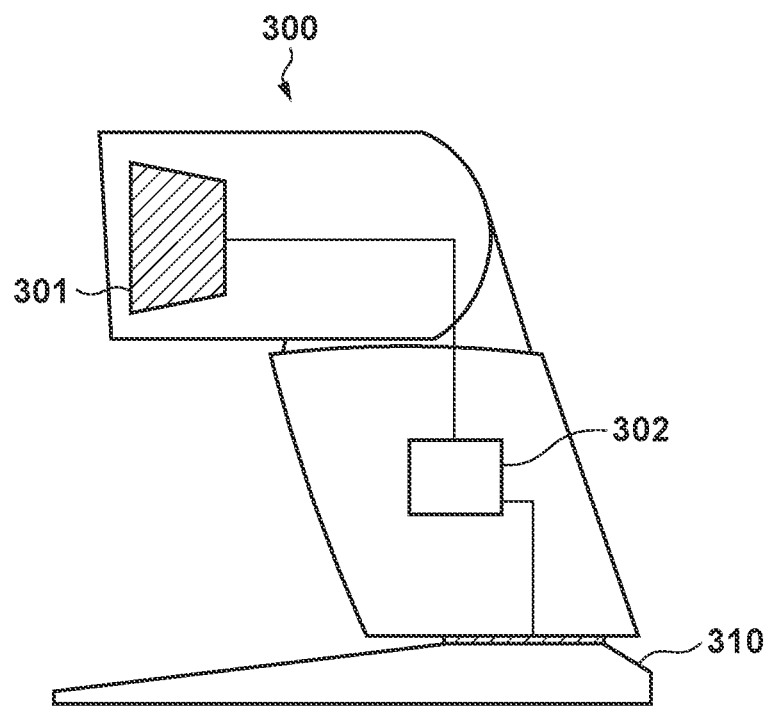
FIG. 4 is a schematic view showing a configuration of a wireless flash.
Figure 5:
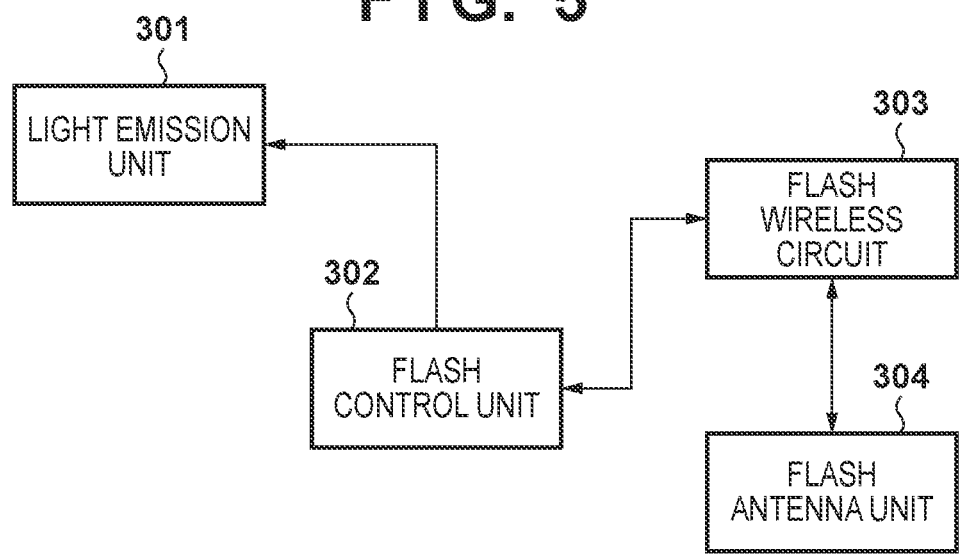
FIG. 5 is a block diagram showing a configuration of the wireless flash.

FIG. 4 is a vertical cross-sectional view showing an example of a schematic configuration of the flash 300, which can perform wireless communication with the camera 100, and FIG. 5 is a block diagram showing an example of a schematic functional configuration of the flash 300. In both drawings, a portion of the configurations of the flash 300 is shown.

A light emission unit 301 includes a flash lamp, a capacitor, and the like, and emits light according to control performed by a flash control unit 302. The flash control unit 302 controls the light emission timing and the light emission amount of the light emission unit 301 based on an instruction from an external apparatus or an instruction given via an operation member. A stand 310 is a support member for allowing the flash 300 to support itself. The stand 310 includes a configuration for supporting the hot shoe connection portion of the flash 300.

A flash wireless circuit 303 performs wireless communication with the camera 100 via a flash antenna unit 304. The flash control unit 302 receives information (instructions) for controlling the light emission timing and the light emission amount from the camera 100 via the flash wireless circuit 303 and the flash antenna unit 304.

Although there is no particular limitation to the method of wireless communication between the camera 100 and the flash 300, in the present embodiment, it is assumed that radio wireless communication using a 2.4-GHz band is used. Hereinafter, operations of an image capture system configured such that the camera 100 and the flash 300 can perform wireless communication will be described.

Figure 6:
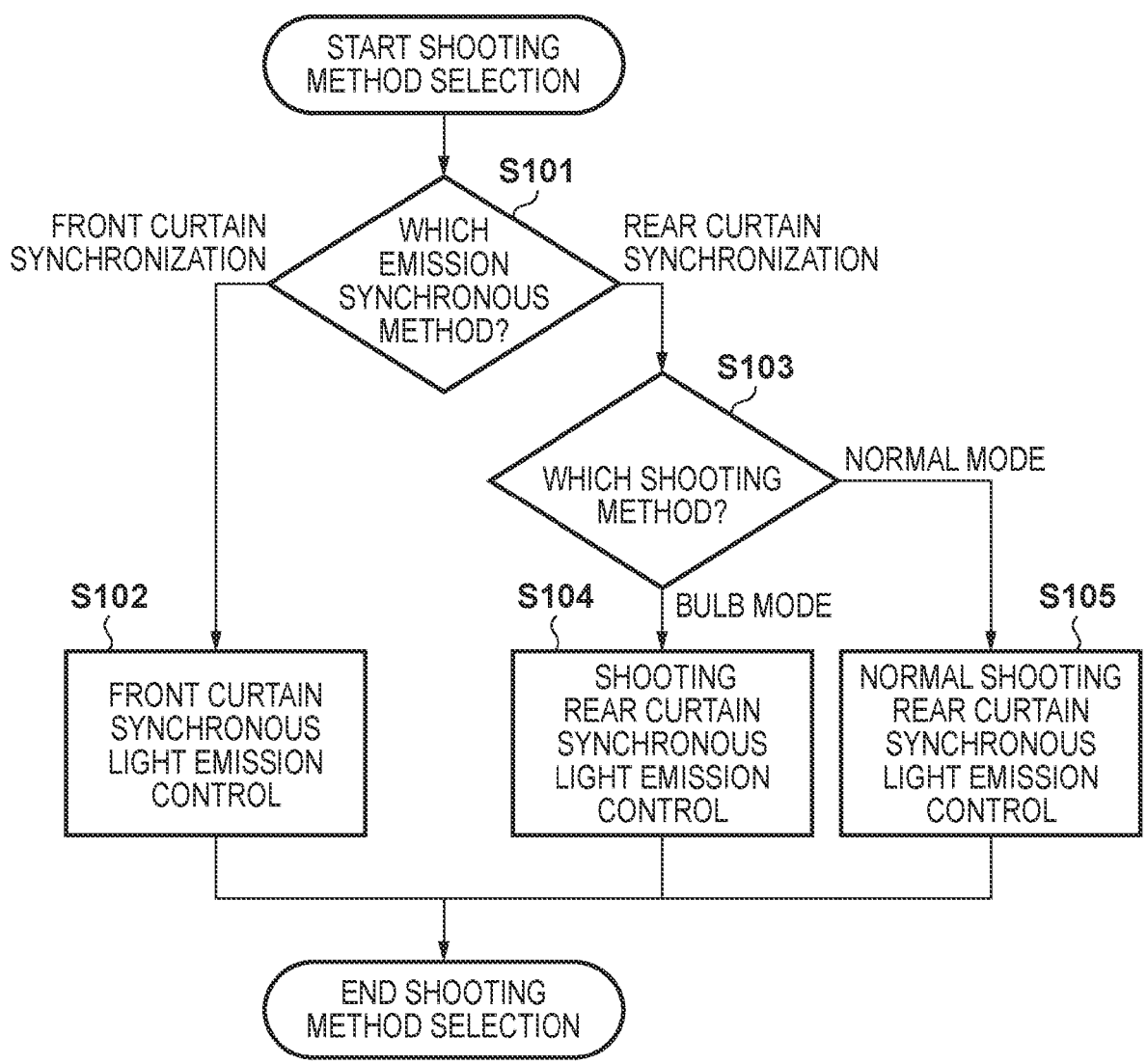
FIG. 6 is a flowchart showing selection processing of a light emission control method.

FIG. 6 is a flowchart relating to selection processing in the light emission control method implemented by the camera microcomputer 104. This processing can be executed at any timing before a shooting start instruction is recognized.

In step S101, the camera microcomputer 104 determines that normal front curtain or rear curtain synchronous light emission control is to be performed. The front curtain synchronous light emission control is flash synchronous light emission control for causing the flash to emit light immediately after the shutter front curtain is fully opened. The rear curtain synchronous light emission control is flash synchronous light emission control for causing the flash to emit light immediately before the shutter rear curtain travels.

In the case of front curtain synchronous shooting, front curtain synchronous shooting is registered as the method in the camera microcomputer 104 in step S102, and shooting method selection ends.

If rear curtain synchronous light emission control is selected in step S101, the camera microcomputer 104 confirms the shooting method in step S103. Specifically, the camera microcomputer 104 checks whether the set shooting mode is a bulb shooting mode in which shooting with an undetermined exposure period is performed, or is another shooting mode. The shooting modes other than the bulb mode are referred to collectively as a normal shooting mode.

In step S104, bulb shooting and rear curtain synchronous light emission control are registered in the camera microcomputer 104 and the shooting method selection ends. In step S105, rear curtain synchronous light emission control in normal shooting is registered in the camera microcomputer 104 and shooting method selection ends.

Rear Curtain Synchronous Light Emission Control During Bulb Shooting

Next, operations of the camera 100 and the flash 300 that are performed when the shooting mode of the camera 100 is the bulb mode and the flash 300 is to perform rear curtain synchronous light emission (when step S104 is selected) will be described with reference to the flowchart in FIG. 7. In rear curtain synchronous light emission control, it is necessary to cause the flash 300 to emit light immediately before shooting is complete. As described above, in the bulb mode, the user can complete shooting at any timing, and therefore the camera microcomputer 104 cannot find out the timing of completing shooting in advance. Accordingly, automatic light adjustment cannot be performed, and it is assumed that the user sets everything, such as the light emission amount, aperture value, and ISO sensitivity, manually before bulb shooting.

Also, as shown in FIG. 1, it is assumed that the shooting is flash synchronous shooting in which the camera 100 and the flash 300 are in a one-to-one relationship, and the camera 100 and the flash 300 have been mutually registered in advance as communication partners through known wireless pairing.

When the power source of the camera 100 is switched on and the camera 100 is set to the flash light emission mode, the camera microcomputer 104 of the camera 100 controls the wireless circuit 107, scans channels by allocating the radio frequency, and searches for the flash 300 that is the communication partner. When the power source of the flash 300 is switched on, the flash 300 controls the flash wireless circuit 303 similarly to the camera 100, sets the channel that is to be used, and is set to a state in which it can respond to a search from the camera 100.

When the camera 100 finds the flash 300 through the search, the camera 100 starts up a network as a network coordinator by starting periodic issuance of beacon packets (beacon signals). The flash 300 plays the role of a network device, and can perform communication at any time by linking as a communication partner of the camera 100.

In this manner, after the system composed of the camera 100 and the flash 300 is activated, in step S201, the camera 100 enters a state of waiting for a release operation from the user (a state of waiting for the switch SW1 to be switched on). In this state, the frequency of the reception operation of the flash wireless circuit 303 of the flash 300 can be reduced by setting the interval of the beacon packets to be issued periodically by the camera 100 to a relatively long interval such as 100 milliseconds. As a result, power saving of the flash 300 can be achieved.

When the switch SW1 is switched on in step S201, the focus point adjustment operation starts in step S202, and a state of waiting for the switch SW2 to be switched on is entered in step S203. When the switch SW2 is switched on in step S203, the camera 100 acquires the charge state of the flash 300 under the control of the camera microcomputer 104, and therefore in step S204, charging complete information indicating the charge state of the flash 300 is acquired by communicating with the flash 300. Then, in step S205, the camera 100 determines whether or not flash light emission is possible.

If light emission is possible in step S205, in step S206, the camera 100 performs setting and communication of the light emission amount set in advance to the flash 300 under the control of the camera microcomputer 104.

Next, in step S207, the camera 100 controls the diaphragm 207 under the control of the camera microcomputer 104, starts front curtain travel of the shutter 102, and starts accumulation by controlling the image sensor 101.

When accumulation of the image sensor 101 is started, in step S208, the camera microcomputer 104 starts counting a wireless non-communication time TX1, which is the amount of time that has elapsed in a state of not communicating with the flash. Although counting is originally to be performed starting from the timing of the light amount notification in step S206, it is ignored here since it is a small amount of time compared to a later-described predetermined time ta.

In step S209, it is determined whether or not the on state of the switch SW2 has been removed. If the on state of the switch SW2 has not been removed, the processing advances to step S210 and if the on state of the switch SW2 has been removed, the processing advances to step S214.

In step S210, if the wireless non-communication time TX1 counted in step S208 is the predetermined time ta or more, the processing advances to step S211, and if it is less than the predetermined time tα, the processing returns to step S209 and the camera microcomputer 104 waits for the on state of the switch SW2 to be removed. The predetermined time tα (predetermined time interval) is set to a time that is shorter than a time tβ at which the power-saving state (hereinafter referred to as "SE state") is transitioned to if the flash 300 has not performed wireless communication or there has been no operation of the flash 300 for a predetermined amount of time. For example, if the time tβ up to when the flash transitions to the SE state is 10 minutes, the predetermined time tα is set to 9 minutes 50 seconds. The SE state is a power-saving state in which the operations of the flash control unit 302 including switching off the display unit 103 and an operation of charging a main capacitor for accumulating electricity needed for flash light emission are stopped, and no operation except for an SE removal operation is received. The SE state is removed through wireless communication from the camera 100 or an operation of the flash operation unit.

In step S211, the camera 100 inquires about charge information to the flash 300 (transmits a stopping signal for stopping transition to the SE mode) such that the flash 300 does not transition to the SE mode, under the control of the camera microcomputer 104. In step S212, the flash 300 checks its own charge state and transmits charging complete information to the camera 100, and the camera receives the information and determines whether or not flash light emission is possible.

In step S213, the camera microcomputer 104 resets the wireless non-communication time TX1 of not communicating with the flash 300 and once again starts counting, the processing returns to step S209, and a state of waiting for removal of the on state of the switch SW2 is waited for.

When the on state of the switch SW2 is removed in step S209, light emission trigger communication, which is a light emission instruction, is performed in step S214. In step S215, the flash 300 performs light emission according to timing information included in the light emission trigger that was received first among multiple light emission triggers (light emission instruction signals) transmitted sequentially from the camera 100.

After light emission, the camera 100 performs rear curtain travel of the shutter 102 under the control of the camera microcomputer 104 in step S216. Thereafter, in step S217, due to the image sensor 101 being subjected to readout control, the shot image data is read out and the sequence for flash synchronous shooting is complete.

Figure 7:
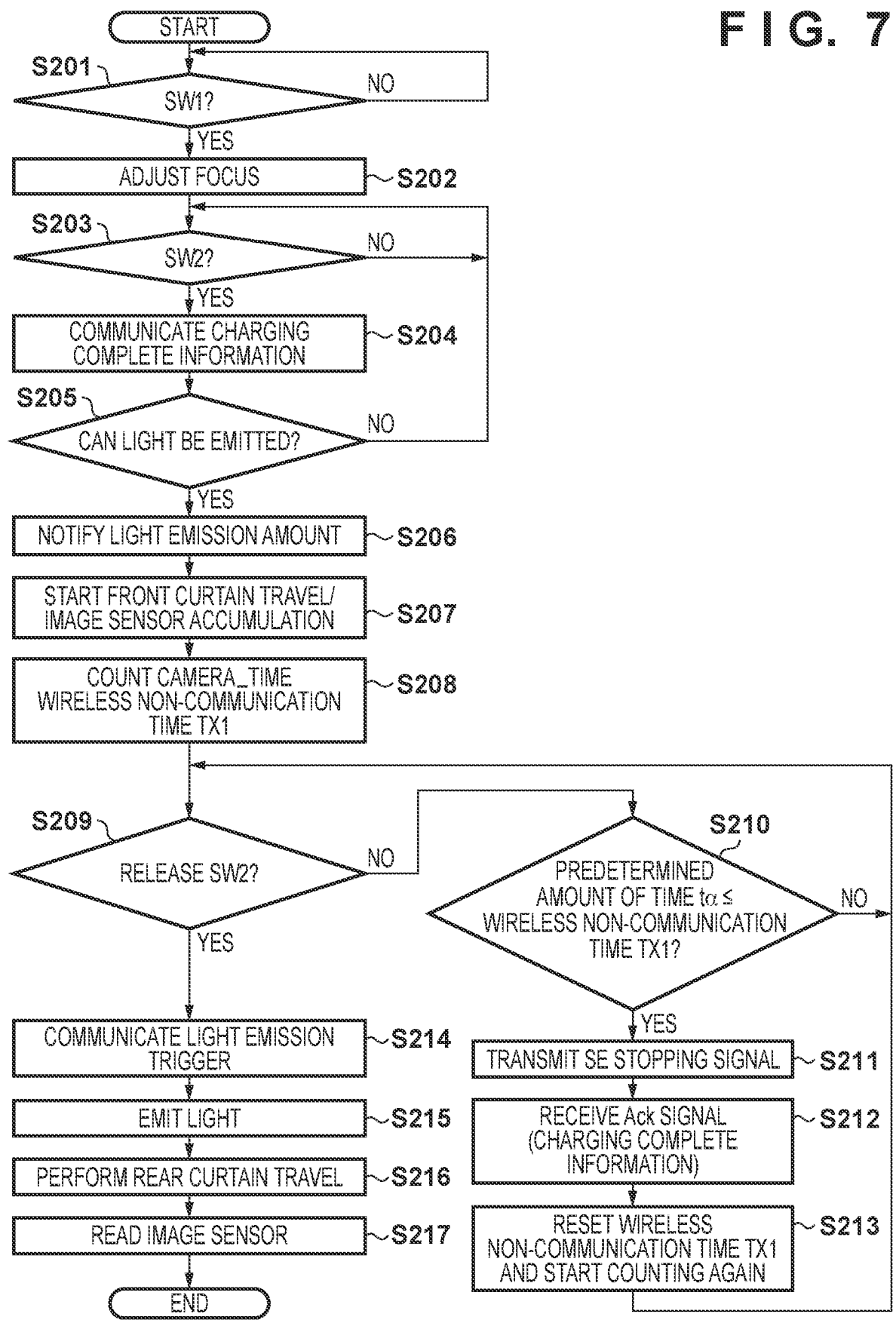
FIG. 7 is a flowchart for a rear curtain synchronous light emission shooting operation performed during bulb shooting in the first embodiment.
Figure 8:
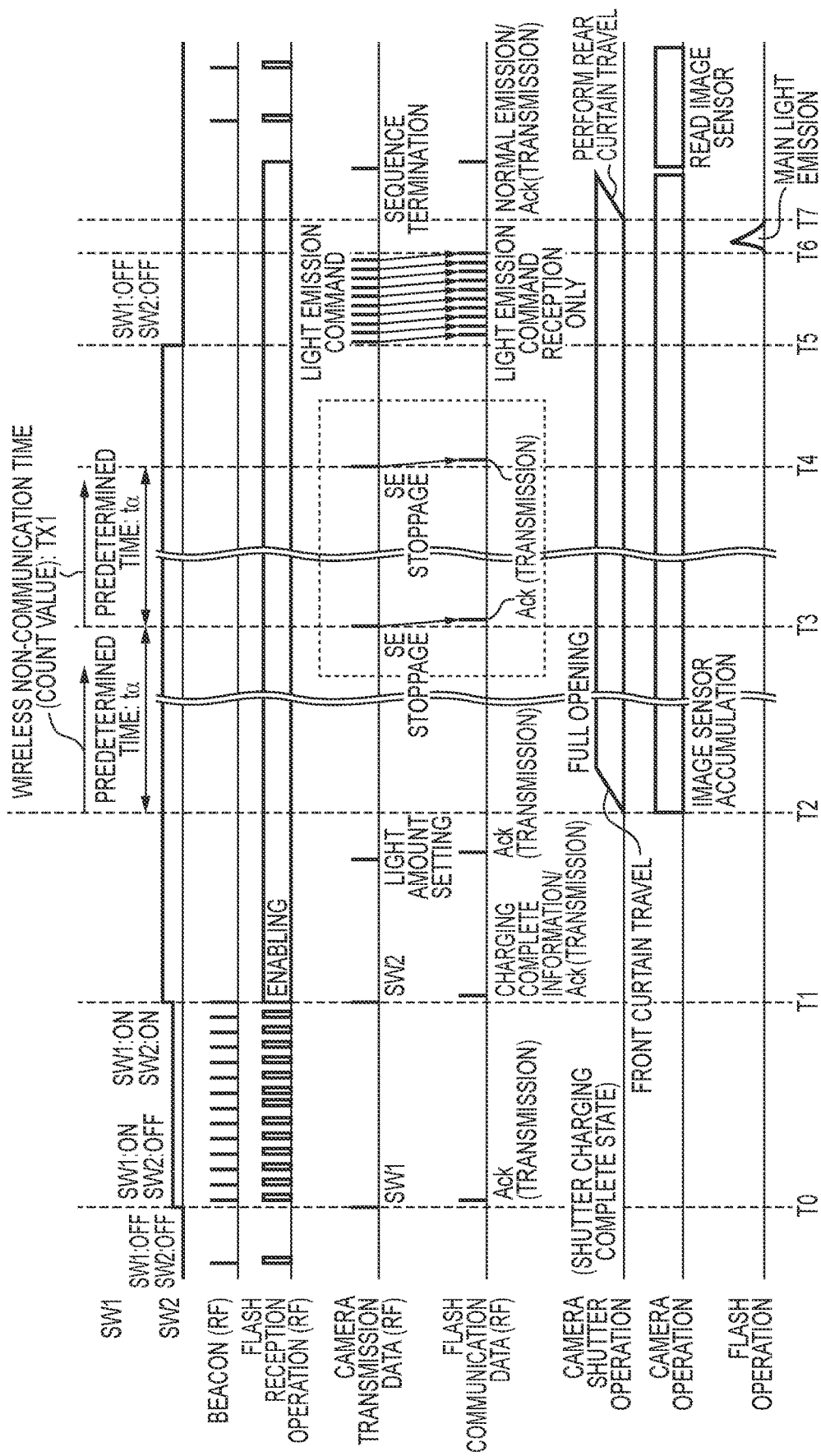
FIG. 8 is a timing chart corresponding to the flowchart shown in FIG. 7.

FIG. 8 is a diagram showing the flowchart in FIG. 7 in the form of a timing chart. Before the switch SW1 is switched on (at T0 or earlier), the camera 100 issues beacon packets in 100 millisecond intervals. Accompanying this, the flash 300 causes the flash wireless circuit 303 to perform a reception operation at 100 millisecond intervals and performs control such that beacon packets can always be received. The time needed to receive a beacon packet is several milliseconds, and when in an idle state in which it is not particularly necessary to perform communication, the flash wireless circuit 303 on the flash side does not need to operate for a period from when the reception operation ends until the next reception operation, and therefore it is possible to achieve power saving.

When the switch SW1 is switched on (T1), the camera 100 transmits packets for notifying the flash 300 that the switch SW1 has been switched on at a timing immediately after the beacon packet (SW1 of camera transmission data). In addition, control is changed such that the beacon packets previously transmitted in intervals of 100 milliseconds are issued at smaller intervals of about 10 milliseconds. By thus changing the interval of issuing the beacon packets before and after the release operation, the response of the flash 300 when the switch SW2 is switched on next (T2) is improved. Accompanying the interval of the beacon packets becoming shorter, the timing of the reception operation of the flash 300 is also shortened to match the interval of the beacons. Accordingly, instead of the response improving, the operation frequency of the flash wireless circuit 303 increases, and power consumption increases.

When the switch SW2 is switched on, the camera 100 transmits packets for notifying the flash 300 that the switch SW2 has been switched on at a timing immediately after the beacon packets (SW2 of camera transmission data). The flash 300 checks its own charge state, and if flash emission is possible, the flash 300 notifies the camera 100 (charging complete information/Ack of flash transmission data). In addition, the flash 300 is set to a state in which wireless packets can always be received.

After entering this state, the camera 100 performs light amount setting communication for conveying the flash light amount set in advance to the flash.

Each time the packets from the camera 100 are received, the flash 300 ensures the reliability of communication by transmitting Ack packets. If no Ack packets are sent from the flash 300 even after the elapse of a predetermined amount of time with respect to the transmitted packet, the camera 100 assumes that a communication error has occurred and performs resending processing for sending the same packet again.

After the light amount setting communication is performed in step S206, the flash 300 enters a state in which a light emission command packet, which is a command packet for a synchronous operation, can be received at any time. That is, the flash 300 enters a standby state in which the main light emission can be performed and synchronous shooting is possible at any time.

The camera 100 controls the image sensor 101 in an accumulation state, together with the start of the front curtain travel (T2) of the shutter 102. The accumulation of the image sensor 101 is started (T2), and the camera microcomputer 104 starts counting the time TX1 of no wireless communication with the flash.

If a long exposure is to be performed in bulb shooting, after the front curtain travel of the shutter, the amount of time for which there is no wireless communication between the camera and the flash increases, and the flash 300 normally enters the SE mode. In the present embodiment, based on the wireless non-communication time TX1 counted by the camera microcomputer 104, packets requesting charging complete information are transmitted from the camera 100 to the flash 300 immediately before the flash 300 transitions to the SE mode. The flash responds to the camera with an Ack signal (flash charging complete information). Until the on state of the switch SW2 is removed, before the flash transitions to the SE mode, the camera 100 repeatedly sends a signal requesting charging complete information to the flash 300, and the flash 300 sends an Ack packet each time a packet from the camera 100 is received. Accordingly, the reliability of communication is ensured. Then, the flash 300 enters a state in which reception is always enabled (period from T3 to T4 is repeated until reaching T5).

When the on state of the switch SW2 is removed (T5), the camera 100 sequentially transmits multiple light emission command packets as light emission triggers to the flash 300 (light emission command of camera transmission data).

The flash 300 performs the main light emission as long as it is possible to receive any one of the multiple light emission command packets. When any one of the light emission command packets is received, it is no longer necessary to receive the remaining light emission command packets, and therefore the flash 300 ends the reception operation.

The camera microcomputer 104 causes the flash 300 to emit light based on the light emission timing notified using the light emission command that was last transmitted to the flash 300, causes the rear curtain of the shutter 102 to travel through the shutter control unit 106, and ends the exposure of the image sensor 101. Note that since the exposure is reliably ended after light emission of the flash 300, the travel of the rear curtain may also be started after the light emission completion response is received from the flash 300.

Then, together with the completion of the rear curtain traveling in the shutter 102, the image sensor 101 is controlled from the accumulation state to the readout state, and reading out of the image data is started. At the same time, the packet for notifying that the sequence has ended is transmitted to the flash 300 (end of sequence of camera transmission data). When the flash 300 has received a light emission command packet and emitted light normally, the flash 300 performs communication for conveying that to the camera 100 (normal light emission/Ack of flash transmission data). The camera 100 determines that the image that was just shot is a shot image obtained during normal flash light emission, attaches the determination to a file as information on the shooting conditions and stores the resulting file when recording the image. Conversely, if flash shooting was not performed normally, information indicating that fact is attached to the image file and the resulting image file is recorded.

When the shooting sequence is ended in this manner, the camera 100 and the flash 300 return to an idle state of waiting for the switch SW1 to be switched on. That is, the camera 100 once again periodically issues beacon packets in 100 millisecond intervals, and the flash 300 causes the flash wireless circuit 303 to perform a reception operation accordingly at a 100 millisecond interval.

As described above, in the present embodiment, when long exposure is performed using rear curtain synchronous light emission and bulb shooting, in the period up to when the on state of the switch SW2 is removed, wireless communication is performed periodically until the SE mode is transitioned to. Accordingly, it is possible to stop the flash from transitioning to the SE mode.

For example, if the flash attempts light emission using rear curtain synchronous light emission upon entering the SE power-saving mode, in an environment in which wireless communication is unstable, communication cannot be instantaneously restarted, and there is a possibility that the timing of light emission will be missed. In contrast, in the present embodiment, due to stopping the transition to the SE mode, it is possible to avoid a case in which this kind of light emission control fails. An environment in which the wireless environment is unstable is, for example, an environment in which there are multiple wireless communication devices such as smartphones in the surrounding area and wireless communications become entangled, or the like. Also, since charging of a main capacitor is stopped while in the SE mode, if the SE mode is returned from immediately before light emission, the charge amount of the main capacitor decreases and light emission cannot be performed with the maximum light amount immediately after the return in some cases. In the present embodiment, this kind of case can also be avoided.

Note that although description has been given premised on a mechanical shutter having a front curtain and a rear curtain being used in the above-described embodiment, the front curtain may also be constituted by a rolling shutter (electronic front curtain) that starts accumulation of the image sensor for each row. Alternatively, instead of the front curtain and the rear curtain, it is also possible to use a global electronic shutter in which starting and ending accumulation is controlled electronically.

Second Embodiment

Rear Curtain Synchronous Light Emission Control in Shooting Other than Bulb Shooting In the second embodiment, only the operation of the camera 100 (camera microcomputer 104) differs from the first embodiment, and therefore description relating to the configurations of the camera 100 and the flash 300 is omitted.

Figure 9:
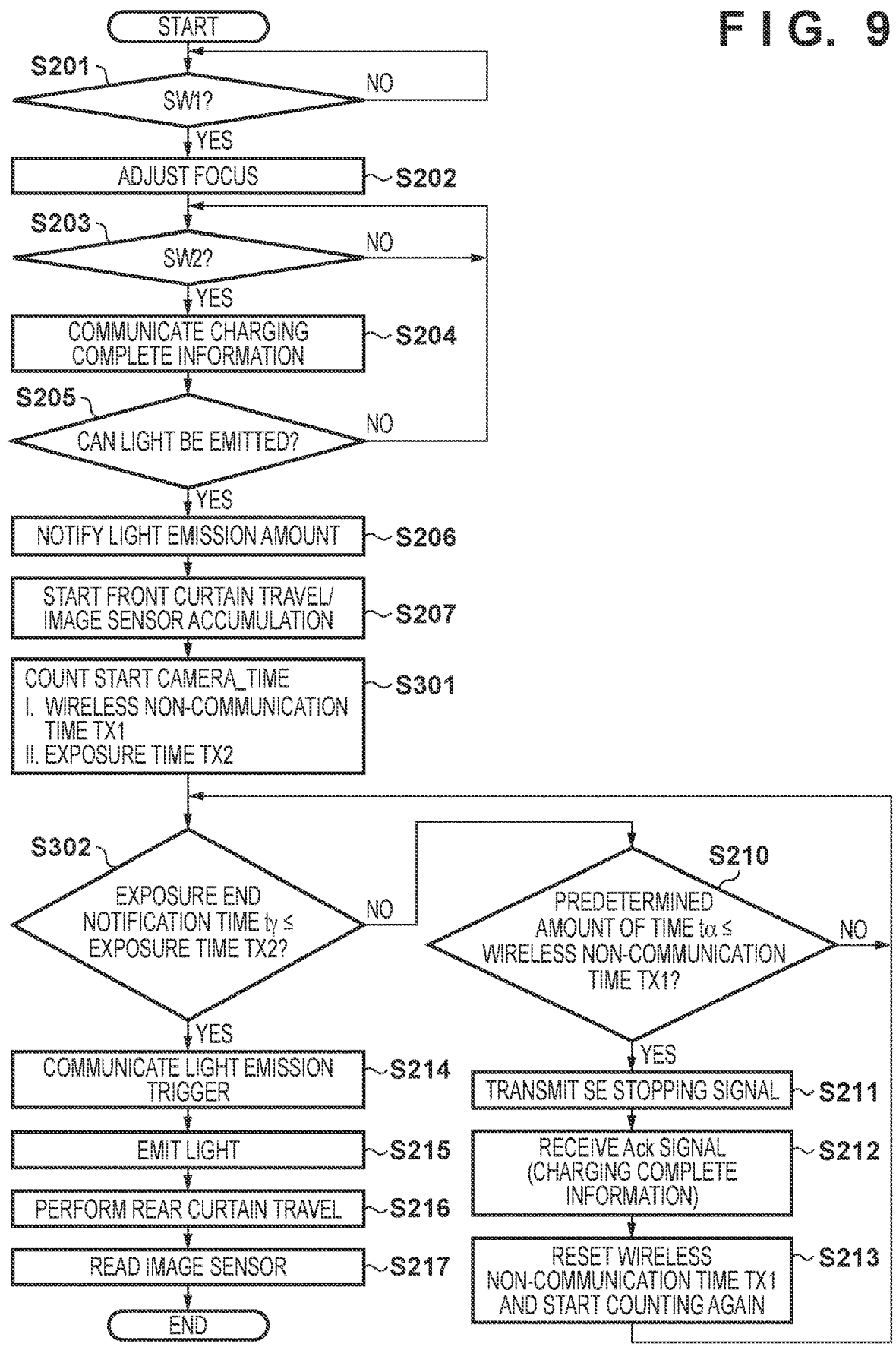
FIG. 9 is a flowchart for a rear curtain synchronous light emission shooting operation performed during long exposure shooting in a second embodiment.

Hereinafter, operations of the camera 100 and the flash 300 performed when the shooting mode of the camera 100 is a normal shooting mode and the flash 300 is caused to emit light with rear curtain synchronous light emission control (during step S105) will be described with reference to the flowchart of FIG. 9. In the present embodiment, in order to make it easier to comprehend the description, description is given assuming that a shutter speed Tv, an aperture, an ISO sensitivity, and a flash light emission amount have all been determined manually. However, they may also be determined using AE (automatic exposure) or a flash automatic dimming system. In FIG. 9, steps for performing operations similar to those of the first embodiment are denoted by the same reference numerals as in FIG. 7 and description thereof is omitted.

In the present embodiment, the processing from step S201 to step S207 is the same as in first embodiment, and therefore description thereof is omitted.

In step S207, when the front curtain of the shutter 102 travels and the accumulation of the image sensor 101 is started, and in step S301, the camera microcomputer 104 starts counting the exposure time TX2 that counts the accumulation time of the image sensor 101 and the wireless non-communication time TX1 of not performing wireless communication with the flash.

In step S302, it is determined whether or not the exposure time TX2 of the image sensor 101 is less than the predetermined exposure end notification time tγ. The exposure end notification time tγ is an amount of time obtained by subtracting (considering) the flash light emission time, the time lag of wireless communication, and the rear curtain travel time from (regarding) a shutter speed Tv determined in advance. If the exposure time TX2 is less than the exposure end notification time tγ, the processing advances to step S210, and processing that is similar to the processing of steps S210 to S213 of the first embodiment is performed. However, only the wireless non-communication time TX1 is reset in step S212, the exposure time TX2 continues to be counted, and the processing returns to step S302.

On the other hand, when the exposure time TX2 reaches the predetermined exposure end notification time tγ, the processing advances to step S214, and processing for light emission is performed. The processing of step S214 and onward is processing that is similar to the first embodiment, and therefore description thereof is omitted.

Figure 10:
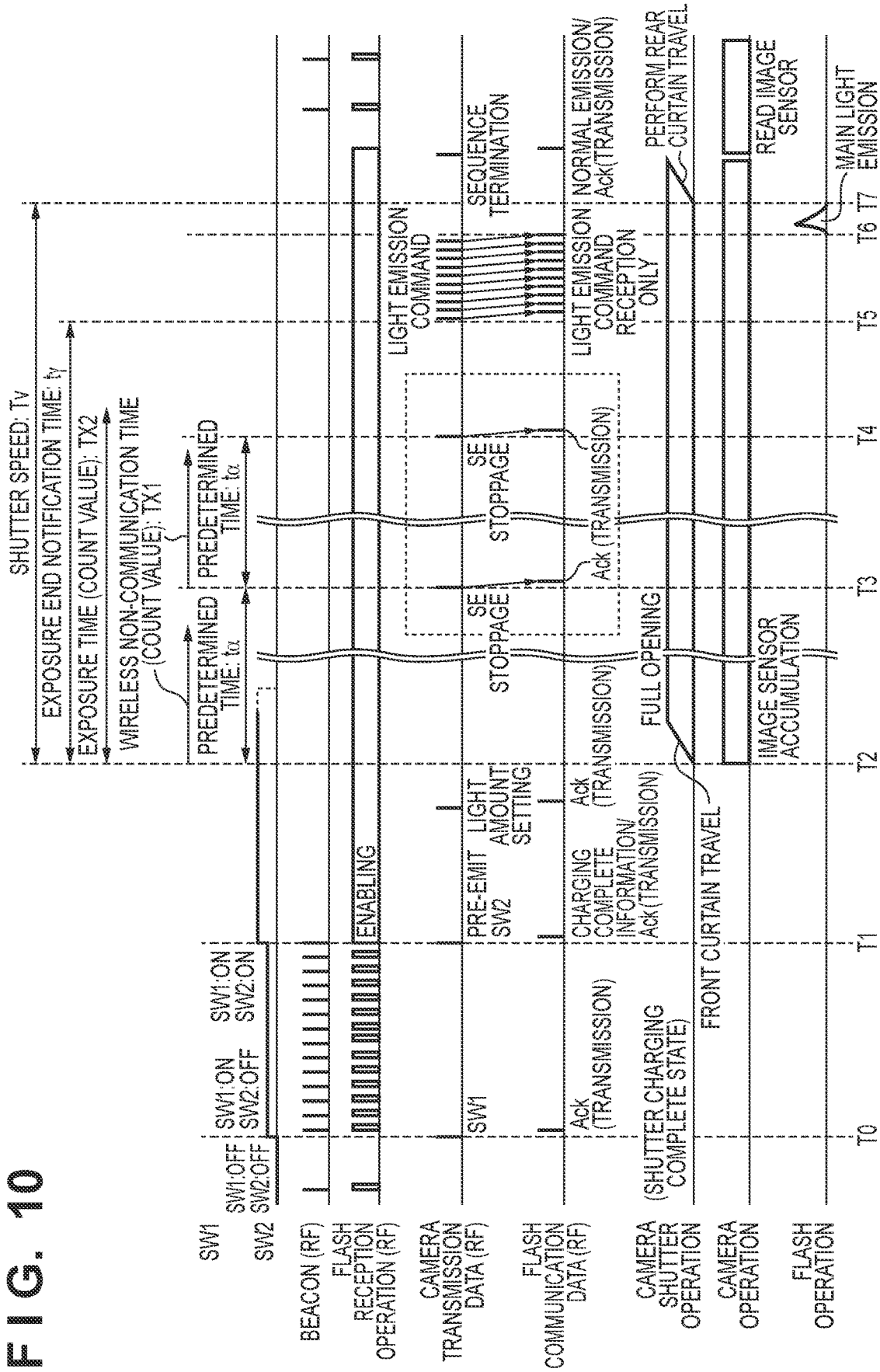
FIG. 10 is a timing chart corresponding to the flowchart shown in FIG. 9.

FIG. 10 is a diagram showing the flowchart in FIG. 9 in the form of a timing chart. Description of processing portions similar to those of the first embodiment is omitted.

After the front curtain of the shutter 102 starts traveling, the camera microcomputer 104 starts counting the exposure time TX2 and the wireless non-communication time TX1 of the image sensor 101.

When the wireless non-communication time TX1 reaches the predetermined time ta, repeatedly, the camera 100 sends a signal for not entering the SE mode to the flash 300 such that the wireless non-communication time TX1 does not exceed the time tβ at which the flash 300 transitions to the SE mode in the period up to when the exposure time TX2 reaches the exposure end notification time tγ. The flash responds to the camera with the Ack signal (flash charging complete information) and enters a state in which the reliability of communication is ensured and the reception of the flash 300 is always enabled.

When the exposure time TX2 reaches the exposure end notification time tγ, the operation thereafter is processing that is similar to that of the first embodiment.

As described above, when long exposure is achieved through rear curtain synchronous light emission, in the period up to when the switch SW2 is released, it is possible to stop the flash from transitioning to the SE mode by periodically performing wireless communication before transitioning to the SE mode.

In the first and second embodiments above, a wireless flash system in which the camera 100 is the master and the flash 300 is the slave was described. However, it is also possible to use a wireless flash system in which a flash that is directly attached to the camera 100 can be controlled as a master and the flash 300 can be controlled as a slave.

Note that in the above description, a case was described in which the flash is controlled wirelessly, but the present invention can be applied also to a case in which the flash is controlled with a wire.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-181653, filed Oct. 1, 2019, which is hereby incorporated by reference herein in its entirety.

What is claimed is:

1. A control apparatus configured to control a flash such that the flash emits light in synchronization with exposure of an image capture apparatus, comprising:
   a wireless communication device configured to perform wireless communication with the flash;
   a controller configured to control the wireless communication device; and
   a counting device configured to count elapsed time that has elapsed since entering a state in which there is no communication with the flash,
   wherein in a period from when the image capture apparatus starts exposure to when the flash emits light, the wireless communication device repeatedly transmits a signal to the flash at a predetermined time interval in order to prevent the flash from transitioning to a power-saving state,
   wherein the predetermined time interval is shorter than an amount of time after which the flash transitions to a power-saving state due to a state continuing in which there is no communication with the flash control apparatus, and
   wherein the wireless communication device transmits the signal to the flash in response to the elapsed time reaching the predetermined time interval.

2. The control apparatus according to claim 1, wherein the wireless communication device transmits a light emission instruction signal to the flash such that the flash emits light in accordance with a timing of ending exposure of the image capture apparatus.

3. The control apparatus according to claim 2, wherein the wireless communication device transmits the light emission instruction signal to the flash immediately before the image capture apparatus causes a shutter rear curtain to travel in order to end exposure.

4. The control apparatus according to claim 3, wherein the wireless communication device transmits the light emission instruction signal to the flash based on a communication time lag, a light emission time of the flash, and a travel time of the shutter rear curtain.

5. The control apparatus according to claim 1, wherein an end of the exposure of the image capture apparatus is instructed by a user.

6. The control apparatus according to claim 1, wherein if a shooting mode of the image capture apparatus is a bulb shooting mode, the wireless communication device transmits the signal to the flash until an on state of a shutter switch of the image capture apparatus is removed.

7. The control apparatus according to claim 1, wherein an amount of time from the start to an end of the exposure of the image capture apparatus is set in advance.

8. The control apparatus according to claim 1, wherein the communication device transmits, as the signal, a signal inquiring about a charge state of the flash to the flash.

9. An image capture apparatus comprising the control apparatus according to claim 1.

10. A flash configured to be able to communicate with the control apparatus according to claim 1, and to prevent transition to a power-saving state in response to a signal received from the control apparatus.

11. A control method for controlling a flash such that the flash emits light in synchronization with exposure of an image capture apparatus, the control method comprising
   counting elapsed time that has elapsed since entering a state in which there is no communication with the flash; and
   causing a wireless communication device for wirelessly communicating with the flash to repeatedly transmit a signal to the flash at a predetermined time interval in order to prevent the flash from transitioning to a power-saving state in a period from when the image capture apparatus starts exposure to when the flash emits light,
   wherein the predetermined time interval is shorter than an amount of time after which the flash transitions to a power-saving state due to a state continuing in which there is no communication with the flash control apparatus, and
   wherein the wireless communication device transmits the signal to the flash in response to the elapsed time reaching the predetermined time interval.

12. A non-transitory computer-readable storage medium storing a program for causing a computer to execute a control method for controlling a flash such that the flash emits light in synchronization with exposure of an image capture apparatus, the method comprising
   counting elapsed time that has elapsed since entering a state in which there is no communication with the flash; and
   causing a wireless communication device for wirelessly communicating with the flash to repeatedly transmit a signal to the flash at a predetermined time interval in order to prevent the flash from transitioning to a power-saving state in a period from when the image capture apparatus starts exposure to when the flash emits light,
   wherein the predetermined time interval is shorter than an amount of time after which the flash transitions to a power-saving state due to a state continuing in which there is no communication with the flash control apparatus, and
   wherein the wireless communication device transmits the signal to the flash in response to the elapsed time reaching the predetermined time interval.

* * * * *